Nov. 4, 1958
M. A. CARTER
2,858,629
ILLUMINATING DISPLAY DEVICE FOR
PHOTOGRAPHIC TRANSPARENCIES
Filed Jan. 5, 1956
2 Sheets-Sheet 1
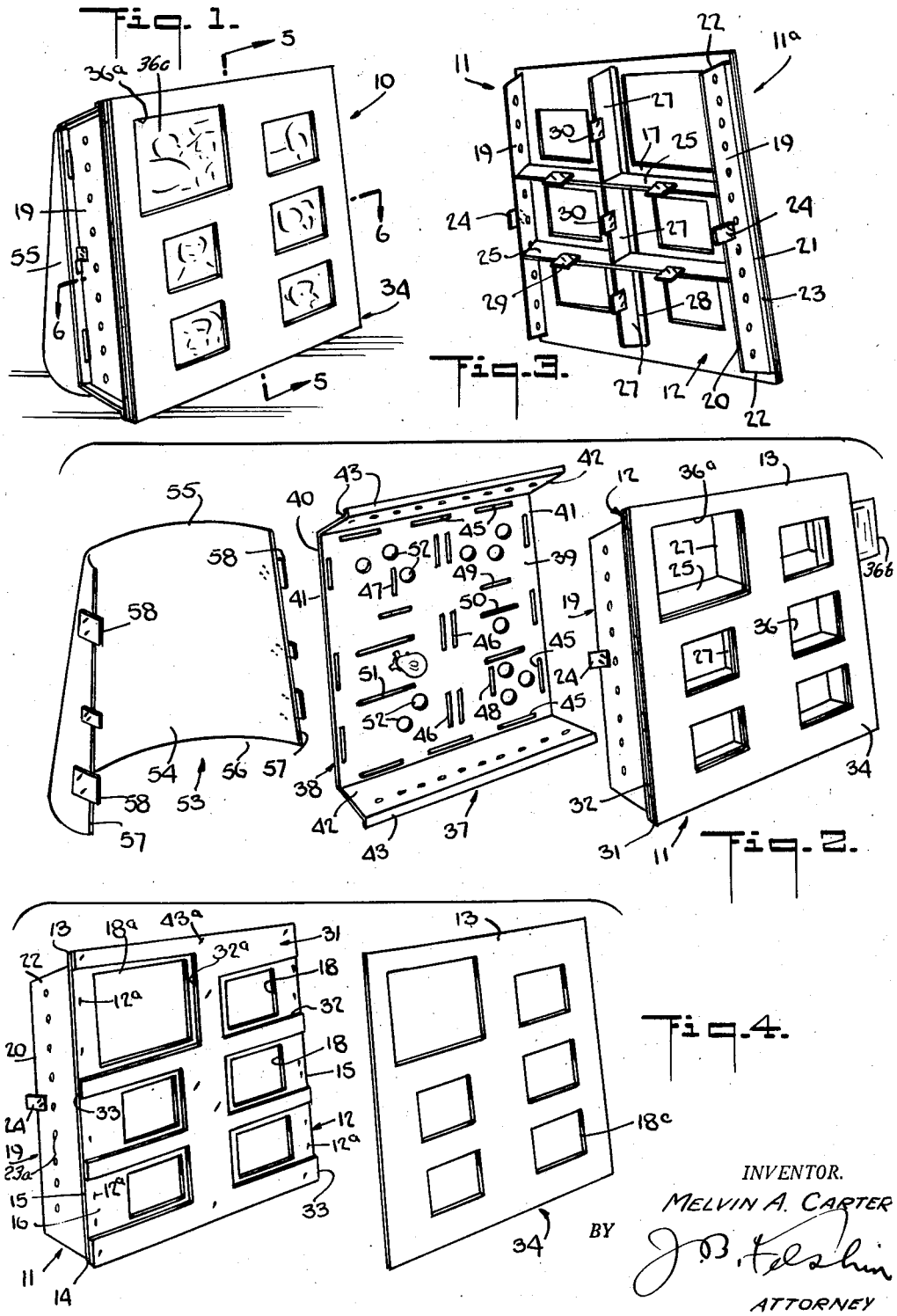
INVENTOR.
MELVIN A. CARTER
BY
ATTORNEY Nov. 4, 1958　　M. A. CARTER　　2,858,629
ILLUMINATING DISPLAY DEVICE FOR
PHOTOGRAPHIC TRANSPARENCIES
Filed Jan. 5, 1956　　2 Sheets-Sheet 2
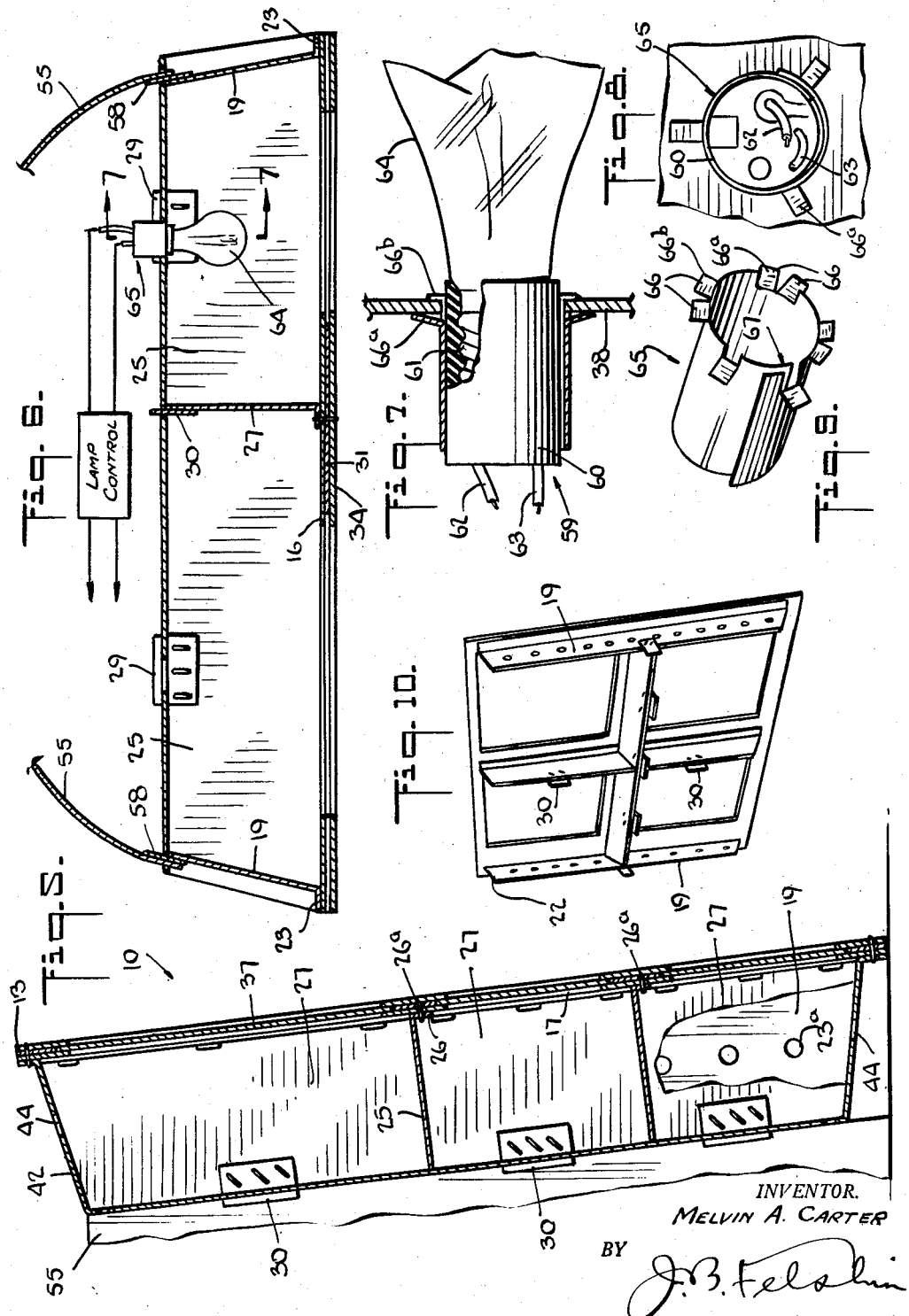
INVENTOR.
MELVIN A. CARTER
BY
ATTORNEY

United States Patent Office 2,858,629
Patented Nov. 4, 1958

2,858,629

ILLUMINATING DISPLAY DEVICE FOR PHOTOGRAPHIC TRANSPARENCIES

Melvin A. Carter, New York, N. Y.

Application January 5, 1956, Serial No. 557,575

12 Claims. (Cl. 40—106.1)

This invention relates to an illuminating display device for photographic transparencies.

One object of this invention is to provide a collapsible knockdown display that will frame and hold a plurality of pictures such as photographic transparent prints, wherein said pictures may be easily inserted and withdrawn from the framing means; that may be made to receive and frame a number of prints of different or of identical dimensions; that will incorporate a self supporting easel means so that the display may be stood up on a flat horizontal surface on any side edge of the display; that shall be provided with a means of illuminating the pictures framed separately; that shall be pleasing in appearance and inexpensive to manufacture.

Another object of this invention is to provide a display device of the character described that shall have a front panel formed with window openings to hold pictures, a chamber forming means behind the panel to hold illuminating means disposed in the chamber, and a supporting means also forming a chamber to house control devices for the illuminating means.

It is also an object of this invention to provide an illuminating means comprised of an electric socket and bulb and improved means to detachably attach said socket quickly and securely through a circular opening in sheet material to form a convenient means of locating the same.

The entire display, in accordance with the present invention, is simple and easy to assembly, and can be folded flat for shipment or storage.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims:

In the accompanying drawings in which is shown various illustrative embodiments of this invention, Fig. 1 is a perspective view of a device in accordance with the present invention, fully assembled;

Fig. 2 is a perspective, exploded view of the device of Fig. 1 showing the front panel face, the back cover and the support easel;

Fig. 3 is a perspective view of the rear face of a front panel adapted to hold six photos;

Fig. 4 is a perspective view showing the front panel with the face plate separated;

Fig. 5 is a sectional view taken on line 5—5 of Fig. 1;

Fig. 6 is a sectional view taken on line 6—6 of Fig. 1;

Fig. 7 is a partial sectional view taken on line 7—7 of Fig. 6;

Fig. 8 is a rear view of the structure shown in Fig. 7;

Fig. 9 is a perspective view of a collet sleeve in accordance with this invention; and Fig. 10 is a perspective view of the rear of a front panel adapted to frame four photos, and showing the flaps.

Referring now in detail to the drawings, Fig. 1 shows the entire assembled display 10 embodying the invention. The same comprises a front panel assembly 11, as shown in Figs. 1, 2, 3 and 4.

The front panel assembly 11 comprises a front panel 11a. The front panel 11a comprises a rear sheet 12, an intermediate sheet 31, and a front sheet 34.

The front panel sheet 12 is preferably square in shape and has a top edge 13, a bottom edge 14, two side edges 15, a front face 16, and a rear face 17. The front panel sheet 12 is formed with a number of spaced openings 18 which may be rectangular in shape.

In Figs. 2, 3 and 5 of the drawings, for the purpose of illustration, are shown six openings 18. One or more of the openings 18 may be larger than the others, as at 18a.

To the rear of the front panel 12 are fastened, as by staples, a number of flaps. In all cases there is a pair of side flaps 19. The side flaps 19 are trapezoid in shape, having two parallel rear and front sides 20 and 21, and upper and lower, rearwardly and inwardly inclined edges 22, so that the trailing edge 20 is shorter than the leading edge 21. The leading edge 21 of each side flap is formed with a flange or lip 23, which may be stapled to the back of the front panel sheet 12 as by staples 12a. It will be noted that there is one side flap 19 adjacent each of the two sides 15 of sheet 12 at the back side 17 thereof. The side flaps are each formed with a row of openings 23a down the center for ventilation and cooling when the display is illuminated. A rectangular tab of cardboard 24 is stapled to the trailing edge of the side flap about at the center thereof, and extends rearwardly thereof.

Rib or partition flaps 25 of elongated trapezoidal shape, and having flanges 26 on one side, are attached horizontally by means of staples 26a through the flanges, to the back side 17 of the front panel 12. The rib or partition flaps 25 are placed horizontally between the openings 18. Three shorter vertical rib or partition flaps 27, having flanges 28, and of similar shape to the other flaps, except that one is of rectangular shape, are stapled in a line vertically at the center of the front panel with the rectangular short flap between the two long horizontal flaps 25. If, as shown, one of the openings 18 is larger than the others, as at 18a, it may be necessary to offset the vertical line of one of the short rib flaps 27 from the center of panel 12.

The long horizontal rib flaps have two tabs 29 and the short ribs one tab 30, each stapled thereto at the trailing edge thereof, extending rearwardly thereof. If desired, the horizontal partitions may be split and the vertical portion may then pass through the split horizontal partitions.

The intermediate panel sheet 31 is stapled to the front panel sheet face 16. The panel sheet 31 is of the same general dimensions as the front panel. However, the openings 32 therein are slightly larger than the corresponding openings 18 and extend to the side edges 33 of the panel 31 forming slots. The openings 32 are of the proper size to fit the photos to be displayed. Sheet 31 acts as a spacer sheet to support the photographs and to form slots for insertion of the photographs.

The front sheet panel 34 is of the same dimensions as the rear panel sheet 12, and is stapled over the face of the intermediate or spacer panel sheet 31, thus completing the front panel 11a seen in Fig. 2. The cover panel sheet 34 may be made of more decorative cardboard or other material than the other panels if desired.

The cover panel sheet 34 together with the framing panel sheet 31 and the rear panel sheet 12 forms a set of framed windows 36 with passages through to the sides formed by the slots or openings 32, panel sheet 31 being sandwiched between the panel sheet 12 having openings 18 and panel sheet 34 having corresponding openings 18c. A photo 36b may be slid from the side of the assembly 11a and will be held there flat. A larger photo 36c would be accommodated by openings 36a.

The partition flaps 25 and 27 form separate compartments behind each opening separating it from the others. When electric lamps are provided, to be hereinafter described, the partition will allow one photo to be illuminated at a time, while the others remain dark.

A back cover 37 is next fitted to the front panel assembly 11. The back cover is formed of sheet cardboard, or like material. The main rear wall portion 38 is rectangular and may be square. The portion 38 has a front face 39, a rear face 40 and two side edges 41. The side edges 41 correspond in the length to the trailing edges 20 of flaps 19. At the top and bottom ends of section 38 of panel 37 are forwardly extending flaps 42 which widen out to form a trapezoid shape similar to side flaps 19. At the forward ends of flaps 42 are flanges 43. A series of cooling ventilating holes 44 may be formed along the flaps 42.

Along each side of portion 38, adjacent the two sides 41 and the flaps 42, is a series of three slots 45. Vertically up the center of portion 39 of the back panel 37 is a double row of three slots 46, one down the center and one offset. In the upper left hand and lower right hand corners is a vertical slot 47 and 48, respectively, as shown in Fig. 2. Horizontally across the center section of portion 39 are three pairs of aligned slots 49, 50 and 51, from top to bottom. Thus, the panel 38 is divided by slots 46, 47, 48, 49, 50 into several "sections." The slots may vary in length to match that of the tabs 24, 29, 30, etc. In each "section," are one or more circular openings 52 which will accommodate lamps or will be henceforth described.

The back cover member 37 is attached to the front unit 11 in the following manner. Tabs 24 are slipped into whichever side slit 45 matches in position. Tabs 29 are slipped into whichever slots 49, 50 or 51 they correspond. The placement of tabs will vary according to the number of picture openings. The more pictures to be displayed, the more partitions will be required to encase them. From one to six pictures may be displayed in various arrangements with the device illustrated. Pictures of different sizes are accommodated by the double row of slots 46 which are engaged by tabs 30. Tabs 30 may be offset to one side or straight down the center depending on which set of slots 46 they are aligned with. Slots 47 are provided for other arrangements not illustrated.

When all tabs are in the proper slots, flanges 43 are stapled to back side 17 of panel sheet 12 adjacent edges 13 and 14 by staples 43a. This construction forms a sturdy unit.

The support or easel 53 consists of a flat cardboard member 54 which is preferably trapezoidal in shape, having the shorter edge of the top. Top and bottom edges 55 and 56, respectively, should be wider than the front panel 11a. Height may be equal or slightly more than that of front panel 11a. Stapled (or otherwise fastened) adjacent to the edges 57 of the support member or easel 54, are a number of spaced tabs 58 which may total three to a side.

The support easel 53 is attached to the cover member 37 by bending or curving it slightly (by applying pressure to side edges 57) and engaging tabs 58 in convenient slots 45. The tendency of the panel 54 to expand out flat will keep the tabs pressed into their slots. The curve of the bottom wall will support the frontal unit erect, but slightly tilted back, resting on the edges of panel sheets 12, 31 and 34, as seen best in Fig. 5.

For shipment, the flaps of unit 11 may be folded flat as may members 37 and 53.

The lighting fixture 59, previously mentioned, consists of a conventional socket 60 having internally threaded metal receptacle 61 connected to an external power supply by wires 62 and 63, and receiving a standard incandescent bulb 64.

There is provided a collet sleeve 65 which may be formed of metal, plastic, or any similar resilient material. An elongated rectangle of such sheet material is rolled or bent into a cylinder or sleeve with overlapping edges. A number of longitudinal cuts are made in one end and tabs 66, formed thereby, are bent outwardly. Some cuts are made longer than others, so that tabs of differing lengths are formed. Two sets of tabs or fingers are used, 66a longer, and 66b shorter. The two sets of tabs are at different longitudinal points relative to the axis of the sleeve.

The collet 65 is squeezed so that the sides overlap as at 67. The collet is then smaller, and may be inserted into any hole 52 with the short tabs forward of the panel surface and long tabs behind (see Fig. 7). When expanded, the tabs will hold the collet in place. An electrical socket 59 is then inserted in the collet. The socket keeps the collet expanded and the collet holds the socket firmly in place. The curvature of the support easel allows room for the sockets and wires to project behind the back cover 37 and cover them from sight. Controls for the lamps are housed between the easel and the cover. The lamp bulbs are disposed in the compartments between the front panel 11a and the rear wall 38.

It will thus be seen that there is provided a device in which the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention I claim as new and desire to secure by Letters Patent:

1. An illuminating display device comprising a front picture framing panel, flaps extending rearwardly from a pair of opposite sides of said panel, a cover member comprising a rear wall, and a pair of opposite forwardly extending flaps, means to attach the flaps on the panel with the rear wall of said cover member, and means to attach the flaps on the cover member with said panel, the flaps on the panel being located between the flaps on the cover member thereby forming a chamber between the rear wall of the cover and the panel.

2. The combination of claim 1, said panel being formed with a plurality of openings to receive photographic transparencies, and partitions extending from the front panel rearwardly thereof to form a separate compartment at the rear of each opening in the panel, and means to attach the partitions with said rear wall of said cover.

3. The combination of claim 1, said front panel comprising a pair of superimposed sheets formed with registering openings, and a spacer sheet between said pair of sheets, and having portions disposed between adjacent openings and spaced from said openings, forming slots extending to the edges of the panel through which transparencies may be inserted to register with said openings.

4. The combination of claim 3, and partitions extending rearwardly from said panel and disposed between the openings, and means to disengageably engage said partitions with said rear wall of said cover member.

5. The combination of claim 1, said attaching means comprising tabs on the flaps of the panel received in slots in the rear wall of the cover.

6. The combination of claim 1, in combination with an easel member, said easel member comprising a transversely curved member having its side edges disengageably engaged with said rear wall of the cover member, whereby said easel member supports the display device and forms a chamber with the rear wall of said cover for reception of control mechanism.

7. A sheet formed with side openings, a pair of similar sheets formed with enclosed openings, corresponding in position to said side openings and slightly smaller than said side openings, said first sheet being sandwiched between said pair of sheets forming a framing member adapted to receive and support photographic transparencies, a pair of flaps attached to said framing member and extending rearwardly thereto, a cover member having a rear wall spaced rearwardly of the panel and having a pair of flaps between the flaps on the panel and extending forwardly and attached to the panel, and a curved easel support attached to the rear wall of the cover and forming a chamber therewith.

8. The combination of claim 7, said rear wall of the cover member being formed with openings to receive lighting fixtures extending through said openings.

9. The combination of claim 8, the rear wall of the cover being formed with slots and tabs on the flaps of the panel received within said slots.

10. The combination of claim 9, said rear wall of the cover formed with slots and said curved easel support being formed with tabs received in the slots in the cover.

11. An illuminating device comprising a panel provided with window openings and means to removably support photographic transparencies at said openings, an enclosing means at the rear of the panel forming a chamber therewith, means on the enclosing means to support lamps within said chamber to illuminate said transparencies, and an easel attached to said enclosing means and forming a chamber therewith for controls for said lamps.

12. The combination of claim 11, in combination with means to divide said chamber into compartments, one for each window opening.

References Cited in the file of this patent

UNITED STATES PATENTS

| | | |
|---|---|---|
| 1,145,692 | Lessing | July 6, 1915 |
| 1,617,304 | Groeschel | Feb. 8, 1927 |
| 1,846,533 | Thompson | Feb. 23, 1932 |
| 2,646,636 | Gandee | July 28, 1953 |
| 2,705,784 | Murphy | Apr. 5, 1955 |
| 2,756,529 | Mazzocco | July 31, 1956 |

FOREIGN PATENTS

| | | |
|---|---|---|
| 495,984 | Great Britain | Nov. 23, 1938 |
| 698,785 | Great Britain | Oct. 21, 1953 |